OR    3,985,420

United States
Grose

[11] 3,985,420
[45] Oct. 12, 1976

[54] MECHANICAL STEP SCANNER
[75] Inventor: Ronald M. Grose, Bolton, Conn.
[73] Assignee: The United States of America as represented by the Secretary of the Air Force, Washington, D.C.
[22] Filed: Oct. 10, 1975
[21] Appl. No.: 621,337

[52] U.S. Cl. .................................. 350/7; 350/285
[51] Int. Cl.² ........................................ G02B 27/17
[58] Field of Search ................... 350/7, 6, 189, 285

[56] References Cited
UNITED STATES PATENTS
| | | | |
|---|---|---|---|
| 2,244,687 | 6/1937 | Goldsmith et al. | 350/7 |
| 3,107,070 | 10/1963 | Willits et al. | 350/6 |

*Primary Examiner*—Ronald J. Stern
*Assistant Examiner*—Bwm de los Reyes
*Attorney, Agent, or Firm*—Joseph E. Rusz; Arsen Tashjian

[57] ABSTRACT

A mechanical step scanner which moves an image in discrete steps relative to a detector array by displacing, rather than by deflecting, the optical path. The scanner includes first and second rotatable reflector discs that are in optical alignment with each other, with the optical path of the image, and with the detector array. Each reflector disc has a plurality of flat surfaces which are in parallel-spaced relationship (i.e., are "stepped"); and, the rotation of each disc is at a preselected synchronized speed. Unlike the prior art, this scanner can be placed at any point in the optical path forward of the first disc; avoids complex optical surfaces and the aberrations resulting from the use thereof; and, is not critically dependent on the angular orientation of the optical path, but is only dependent on the stability of the angle selected.

5 Claims, 10 Drawing Figures

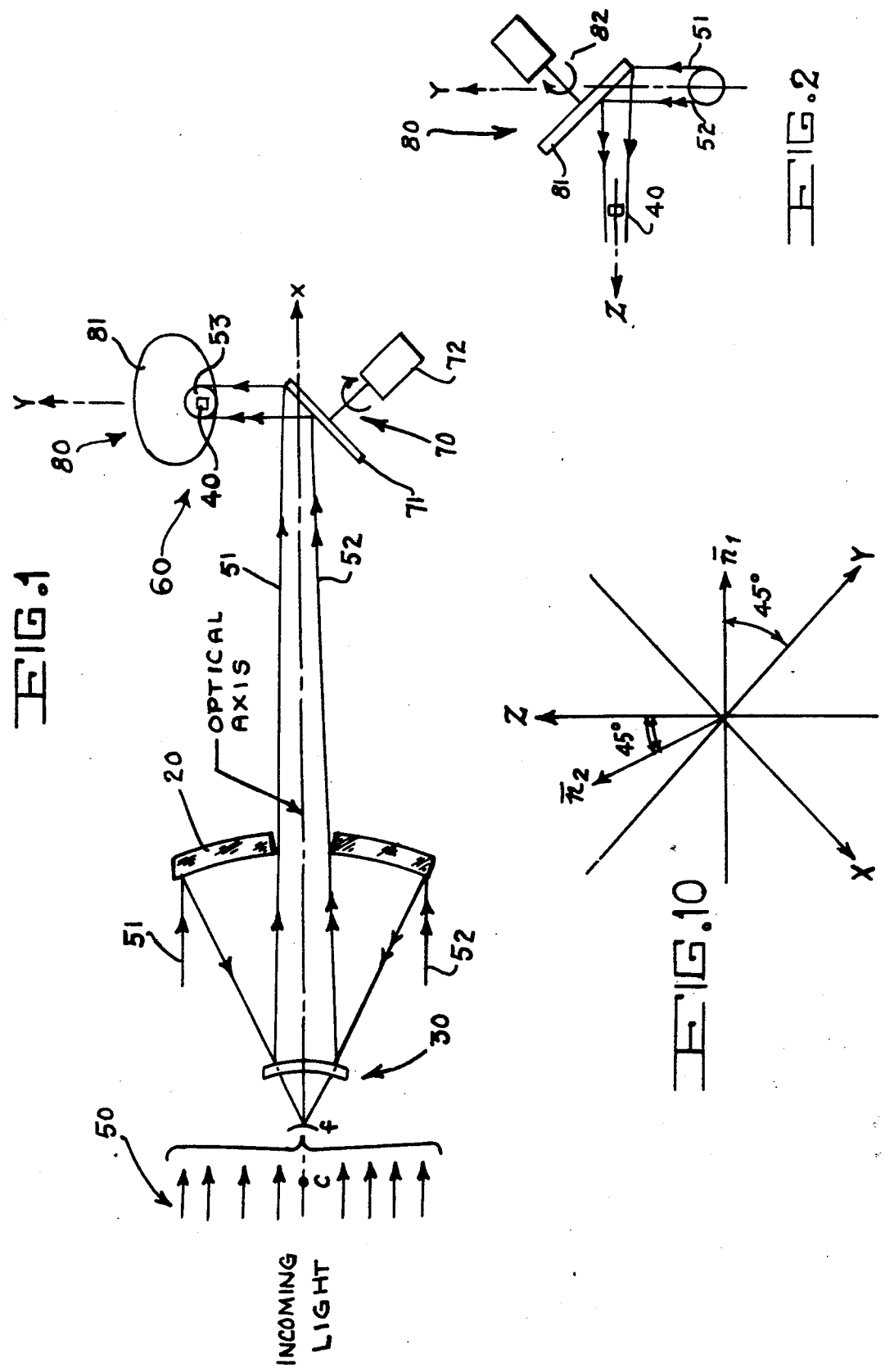

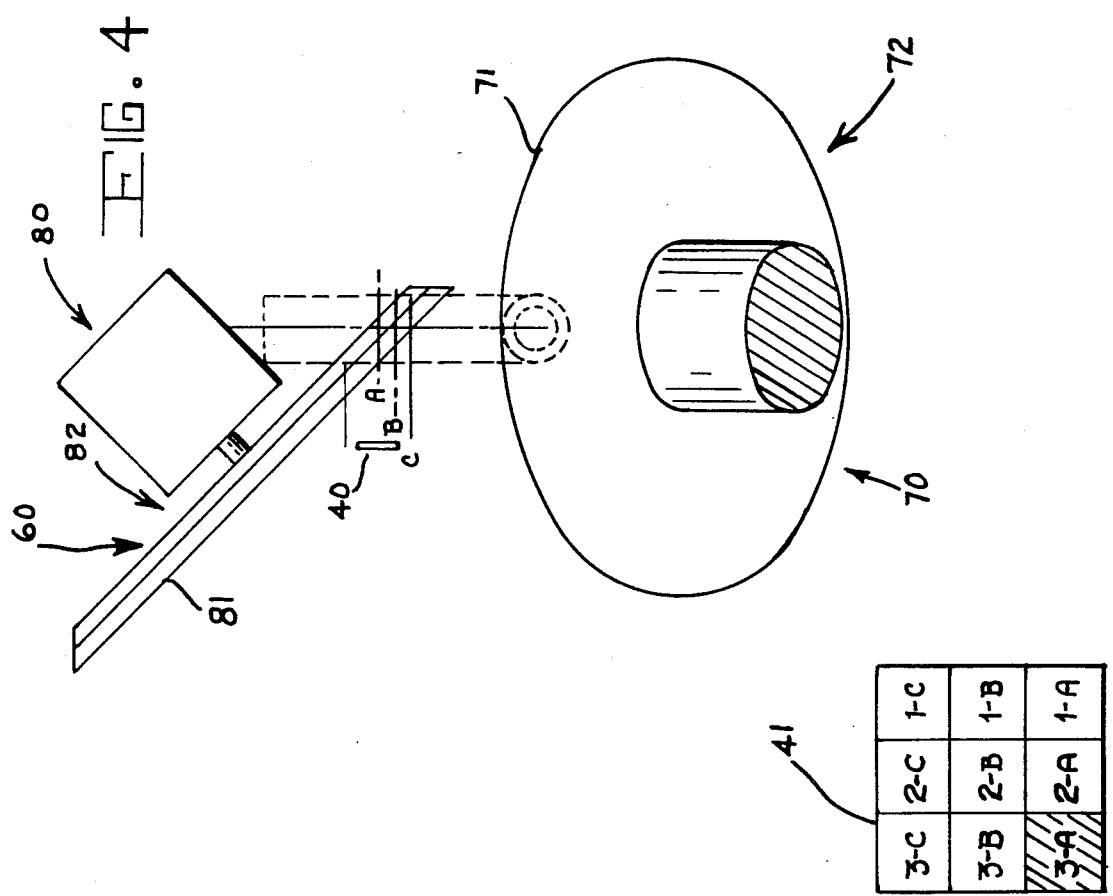
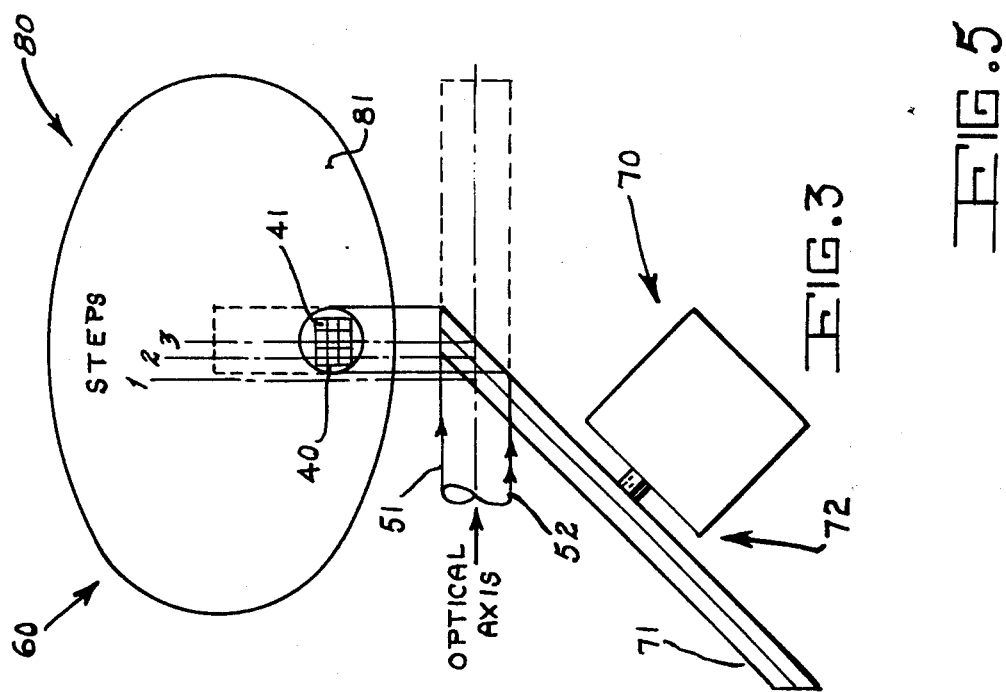

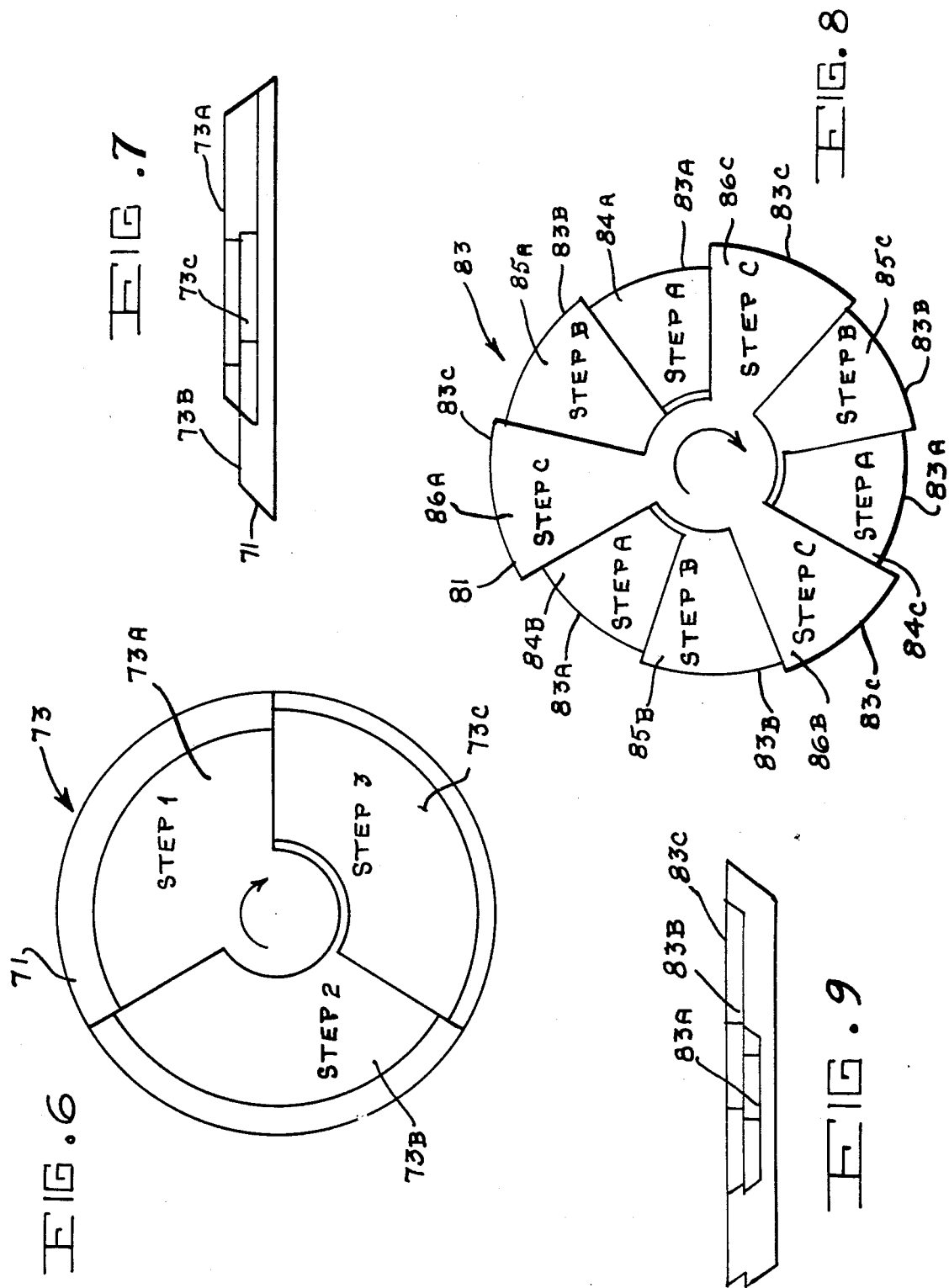

MECHANICAL STEP SCANNER

STATEMENT OF GOVERNMENT INTEREST

The invention described herein may be manufactured and used by or for the Government for governmental purposes, without the payment of any royalty thereon.

BACKGROUND OF THE INVENTION

This invention relates to scanners and, more particularly, to a mechanical step scanner adapted for use in providing high-resolution, high-speed image tracking.

To provide such high-resolution, high-speed image tracking, it may be necessary to dissect the image into segments, sections, blocks or the like for data acquisition. If such action is necessary, then the image may be dissected into (and the data for each segment, or the like, may be acquired in) a serial (i.e., sequential) fashion by a multi-element detector array. Therefore, it is desirable to move the image relative to the array in a precise and systematic manner. In an active tracker synchronized step scanning devices may be employed in both the transmitter and the receiver optical paths to illuminate the target and to receive the reflected energy. For a passive tracking system, these same stepped scan devices may be employed to move the image relative to the detector array. My inventive stepped scanner, described herein, is a mechanical means of providing step scanning of either a transmitter or of a receiver optical path.

Generally, scanning devices are mechanized with a linear or harmonic motion which moves an optical surface to change the angle of reflection of the optical path to image it on to the detector surfaces. My inventive scanner, however, moves the image relative to the detector array in a systematic manner in a step-wise fashion by displacing, rather than by deflecting, the optical path. In this manner, the stepping motion is independent of the physical dimensions between the scanner device and the array. In fact, the scanner device can be placed immediately ahead of the array, in a region where the cross section of the focused optical beam is relatively small; whereas, in a typical deflection-type scanner of the prior art, the deflection angle is inversely proportional to the distance between the scanner and the detector array, and thus to keep the deflection angle small, the array must be displaced from the scanner by relatively large distances.

Further, in a deflection scanner the reflective surfaces must be helical or conical surfaces. These surfaces will yield aberration of the image in the direction parallel to the motion of the reflective surface. In my displacement scanner, the reflective surfaces are all optically flat and parallel. The planes of these surfaces are normal to their axis of rotation. This greatly simplifies the manufacture and alignment of my inventive scanner device, and eliminates any aberration of the image.

SUMMARY OF THE INVENTION

This invention pertains to a novel mechanical step scanner, adapted for use in high-resolution high-speed image tracking, whereby the optical path of the image (and therefore, of the image itself) is displaced, rather than deflected.

Therefore, the principal object of this invention is to teach the structure of a preferred embodiment of a mechanical step scanner as hereinabove described.

This principal object, as well as other equally important and related objects, of my invention will become readily apparent after a consideration of the description of my invention, coupled with reference to the Figures of the drawings.

DESCRIPTION OF THE DRAWINGS

FIG. 1 is a front view, in simplified form and partially schematic, of a preferred embodiment of my invention, as adapted for use in providing high-resolution high-speed image tracking;

FIG. 2 is a right side elevation view, also in simplified form and also partially schematic, of a pertinent portion of the preferred embodiment shown in FIG. 1;

FIG. 3 is a front view, in simplified form, partially schematic, enlarged, and in greater detail, of some of the major components of the preferred embodiment shown in FIGS. 1 and 2;

FIG. 4 is a side elevation view of some of the major components of the preferred embodiment, as said components are shown and are positioned in FIG. 3;

FIG. 5 is an enlarged and detailed view of a diagrammatic representation of the field of view of the detector array, which will be discussed later herein, and which is shown in other views in FIGS. 1-4;

FIG. 6 is a front view, in simplified form, enlarged and in detail, of a major component of the preferred embodiment;

FIG. 7 is a side elevation view, also in simplified form, of the major component shown in FIG. 6;

FIG. 8 is a front view, in simplified form, enlarged and in detail, of another major component of the preferred embodiment;

FIG. 9 is a side elevation view, also in simplified form, of the major component shown in FIG. 8; and FIG. 10 is a two-dimensional representation in three dimensional rectangular Cartesian coordinate form of the relative orientation of unit normal vectors to two major components of the preferred embodiment.

DESCRIPTION OF THE PREFERRED EMBODIMENT

With reference to FIG. 1, therein is shown a typical receiver optics configuration, using a Cassegrain primary reflective lens 20 and a secondary relay optics system 30 to image the collected energy (i.e., the incoming light 50) onto a detector array 40. The direction of the incoming light 50 is as designated by the arrows (i.e., from the reader's left); and, in the interest of maintaining simplicity of the drawings, the incoming light is represented by representative constituent light rays 51 and 52. The resulting image is referenced by numeral 53. Also shown are the X and Y axes (i.e., X Y-plane) of an applicable three dimensional rectangular Cartesian coordinate representation that is depicted in full in FIG. 10, which will be discussed later herein.

Still with reference to FIG. 1, therein also is shown, in simplified form, a preferred embodiment 60 of my inventive mechanical step scanner, as adapted for use in high-resolution high-speed image tracking. As shown in FIG. 1, the embodiment 60 includes: a first step drive unit 70 that further includes a first rotatable reflector disc 71, and a first means (generally designated 72) for rotating the rotatable disc 71 at a preselected speed; and, a second step drive unit 80 in cooperative association with the first step drive unit 70, wherein it 80 includes a second rotatable reflector disc 81.

As can be seen, the first rotatable reflector disc 71 is in optical alignment with the image 53 or, more accurately, with the optical path limited and defined by representative emitted beam light rays 51 and 52, which is to be tracked.

Additionally, second rotatable reflector disc 81 is in optical alignment with first rotatable reflector disc 71.

It is here to be noted that the terms "optically aligned", "in optical alignment with", and the like are intended to mean, as they do in the optical art, that the optical components or other objects referred to are in line with each other in the sense that they are in the path of the incoming beam of light (or representative rays thereof) which is being emitted, or reflected, or the like.

In FIG. 2 there is shown, in simplified form, a right side elevation view of a pertinent portion of the preferred embodiment 60 that was shown in FIG. 1. More specifically, in FIG. 2 is shown second step drive unit 80, with second rotatable reflector disc 81 thereof, and also with second means (generally designated 82) for rotating the rotatable reflector disc 81 at a preselected speed in synchronization with the preselected speed of the first rotatable reflector disc 71, FIG. 1.

Also shown in FIG. 2 are: the Y and Z axes (i.e., the YZ-plane) of an applicable three dimensional rectangular Cartesian coordinate representation that is depicted in full in FIG. 10, which will be discussed later herein; and, the detector array 40.

With reference to both FIGS. 1 and 2, it is to be noted that the field of view of the image 53 is larger than the detector array 40; however, if a pair of suitable scanner step drive units (such as 70 and 80) are employed, with each scanner reflector disc thereof (such as 71 and 81) deflecting the optical path (51 and 52) by approximately 45°, and if each scanner reflector disc has a plurality of two or more optically flat segment surfaces which are in parallel spaced relationship to each other, then: the optical path will be folded and reduced in overall length; and, the segment surfaces of the respective scanner reflector discs will change the optical path in such a manner as to displace the image in a multiplicity of discrete steps per frame.

FIG. 3 is a front view, in simplified form and enlarged and in greater detail, of some of the major components of the preferred embodiment 60 shown in FIG. 1 and 2. In FIG. 3 first step drive unit 70 can be seen, with first rotatable reflector disc 71 and first rotating means 72, and second rotatable reflector disc 81 of second step drive unit 80.

Also shown are representative light rays 51 and 52, and detector array 40 with a diagrammatic representation (generally designated 41) of its total field of view as it is "stepped" by the cooperative action of the scanners 70 and 80 and, more specifically, by the rotating reflector discs 71 and 81 thereof.

With reference to FIG. 4, therein are shown some of the major components of the preferred embodiment 60, in a side elevation view. The major components shown are those previously shown in FIG. 3 and as positioned therein. In FIG. 4 second step drive unit 80 can be seen, with second rotatable reflector disc 81 and second rotating means 82, and first rotatable reflector disc 71 (and a portion of first rotating means 72) of first step drive unit 70.

FIG. 5 is an enlarged and detailed view of a diagrammatic representation of the field of view 41 of the detector array 40. The representation 41 is in the form of a multiplicity of blocks (preferably 9 in this case, in a 3 × 3 — block square configuration), as will be explained later, that are of equal area and, as a matter of convenience, are designated 1-A, 1-B, 1-C, 2-A, 2-B, 2-C, 3-A, 3-B, and 3-C, as indicated in the Figure.

With reference to FIG. 6, therein is shown a front view, enlarged and in detail, of the first rotatable reflector disc 71 of the first step drive unit 70 of the preferred embodiment 60. This first disc 71 is divided into a first plurality 73 of identical segments, preferably three 120 degree ones (such as 73A, 73B and 73C), which are optically flat and are in parallel spaced relationship to each other. In the interest of maintaining the simplicity of an explanation to be given later herein, said segments of the first plurality 73 are legended "step 1", "step 2" and "step 3" on, respectively, segments 73A, 73B and 73C.

FIG. 7 is a side elevation view of the "stepped" first rotatable reflector disc 71 that is shown in front view in FIG. 6.

With reference to FIG. 8, therein is shown a front view, enlarged and in detail, of the second rotatable reflector disc 81 of the second step drive unit 80 of the preferred embodiment 60. This disc 81 is divided into a second plurality 83 of segments, preferably three 120° ones (such as 83A, 83B and 83C), which are optically flat and are in parallel spaced relationship to each other. However, in this disc 81 each optically flat surface (i.e., 83A, 83B and 83C) is further divided, preferably, into three multiplicities 84A, 84B and 84C of sections (i.e., 83A into 84A, 84B and 84C; 83B into 85A, 85B and 85C; and, 83C into 86A, 86B and 86C), with each section corresponding to each of the 120° segments (i.e., 73A, 73B and 73C) of disc 71. Thus, over each 120 degrees of second disc 81 there are three optically flat sections displaced one from the other.

Still with reference to FIG. 8, and stated another way, each segment (such as, for example, 83A) of second plurality 83 of segments of second disc 81 is further divided into a multiplicity of sections (such as, for example, 83A is divided into sections 84A, 84B and 84C) which are coplaner and are in uniform spaced relationship to each other, and each multiplicity (i.e., 83A, 83B and 83C) of sections consists of a total number of sections that is equal to a positive integer multiple (such as 1 in this case) of the total number of segments in the first plurality 73 of segments, of which there are three (i.e., 73A, 73B and 73C, FIG. 6) in this illustrative case. In this FIG, as in FIG. 6, and also in the interest of maintaining the simplicity of an explanation to be given later herein, the three sections 84A, 84B and 84C of the first multiplicity 83A are each legended "step A"; and, the three sections 85A, 85B and 85C of the second multiplicity 83B are each legended "step B"; and, the three sections 86A, 86B and 86C of third multiplicity 83C are each legended "step C".

Now, with reference to FIG. 9, therein is shown a side elevation view of the "stepped" second rotatable reflector disc 81 that is shown in front view in FIG. 8.

MANNER OF OPERATION OF THE PREFERRED EMBODIMENT

Generally

With reference to FIG. 10, which is a two-dimensional representation in three dimensional rectangular Cartesian coordinate form, the reader is to assume: that $\bar{\eta}_1$ and $\bar{\eta}_2$ are unit normal vectors to the scanner discs 71 and 81, and are along the scanner span axis; that $\bar{\eta}_1$ lies in the XY-plane and at 45° to the Y-axis; and, that $\bar{\eta}_2$ lies in the YZ-plane and at 45° to the Z-axis.

Since the two scanner discs 71 and 81 are not collocated, the two unit vectors (or rotational spin vectors) of the two scanner discs 71 and 81 are actually skewed lines in space; and, thus, they are not in one plane.

The scanner discs form two 45° mirrors, deflecting the beam by 90° at each surface. The three stepped surfaces or segments 73A, 73B and 73C on the first disc 71 translate the image along X by $\Delta X$. The nine stepped surfaces 84A-C, 85A-C and 86A-C on the second scanner disc 81 translate the image along Y by $\Delta Y$. With the rotation of the two stepped scanner discs 71 and 81 synchronized, the image is systematically stepped relative to a fixed sensor array, such as 40, as illustrated in FIGS. 3–5. The array 40 lies in a Z-equals-a-constant-plane, or a plane normal to the Z-axis. Thus, as the image is stepped in $\Delta X$ and $\Delta Y$, it moves over the image plane.

More Specifically

With reference to FIGS. 3, 4 and 5, first scanner step drive unit 70 deflects the optical path (limited by representative light rays 51 and 52) by approximately 45°, and displaces the reflective surface along step paths 1, 2 and 3 which axially move the image relative to the detector array 40 along columns 1, 2 and 3, as shown in FIG. 5. Second scanner step drive unit 80 then deflects the optical path in a plane essentially normal to that formed by the original optical axis and the deflected optical path of first scanner step drive unit 70. Then, the three stepped surfaces or segments 83A, 83B and 83C, FIG. 8, displace the optical path along paths A, B or C, as shown in FIG. 4. With suitable dimensioning and configuration of, and with the synchronized rotation of, stepping units 70 and 80, the image can be systematically stepped relative to the array, such that any desired block coverage of the image readout can be implemented. As depicted in FIGS. 3 and 4, the optical image is along paths 3 and A, such that the image is displaced in such a manner that block 3A, FIG. 5, is superimposed on the detector array 40.

If, as shown in FIG. 3 for illustrative purposes, there is a 45-° angle between the incident optical path (limited by representative light rays 51 and 52) and the optical flats of the first stepped scanner disc 71, then the displacement (i.e., the separation) between optical flats (such as 73A, 73B and 73C, FIG. 6) is 0.707 of the desired displacement distance in and of the reflected path. Similarly, with regard to second stepped scanner disc 81 and the optical flats thereof (such as 84A-C, 85A-C and 86A-C), the displacement of these optical flats is equal to the desired displacement in the reflected path times (i.e., multiplied by) the sine of the incidence angle (i.e., 45°), or 0.707, times the desired displacement (for an incidence angle of 45°).

If the motion of these two stepped drive units 70 and 80 is synchronized in position and speed, the desired step scanning of the image, relative to the array 40, will be attained. The angular rate of rotation of both discs is equal to the observational frame rate for the discs depicted. The scanning sequence for the discs 71 and 81, as structured in FIGS. 6–9 and synchronized, would be 1A, 1B, 1C, 2A, 2B, 2C, 3A, 3B and 3C, since the discs would step the image relative to the array along lines 1, 2 and then 3, stepping from position A to B and then to C in each line.

CONCLUSION

It is abundantly clear from all of the foregoing, and from the Figures of the drawings herein, that the stated principal object of this invention has been attained. In addition, related desirable objects also have been attained. For example: this unique mechanical step scanner 60 can be inserted at any point in the optical path of the relay system 30, FIG. 1; the scanner 60 employs only mutually parallel optically flat surfaces (such as 73A-C, 84A-C, 85A-C and 86 A-C), and thus avoids complex optical surfaces and aberrations resulting from the use thereof; and, the scanner 60 is not critically dependent on the angular orientation of the optical path, but is only dependent on the stability of the angle selected.

It is to be noted that, although there have been described the fundamental and unique features of my invention as applied to a particular preferred embodiment, various other embodiments, adaptations, substitutions, additions, omissions, and the like, will occur to, and can be made by, those of ordinary skill in the art, without departing from the spirit of the invention. For example, the number of the surfaces on each disc 71 and 81 can be doubled, provided that the discs are rotated at a speed which is equal to half the frame rate.

What is claimed is:

1. A mechanical step scanner, adapted for use in high-resolution high-speed tracking of an image, wherein said image has an optical path, comprising:
   a. a first step drive unit which includes:
      1. a first rotatable reflector disc in optical alignment with said optical path of said image to be tracked, wherein said first reflector disc is divided into a first plurality of segments which are optically flat, are in parallel spaced relationship to each other, and are of a predetermined total in number.
      2. and, a first means for rotating said first rotatable reflector disc at a preselected speed;
   b. and, a second step drive unit, in cooperative association with said first step drive unit, which includes:
      1. a second rotatable reflector disc in optical alignment with said first rotatable reflector disc, wherein said second reflector disc is divided into a second plurality of segments which are optically flat, are in parallel spaced relationship to each other, and are of a predetermined total in number, and wherein each said segment of said second plurality of segments is further divided into a plurality of multiplicity of sections, which said sections in any said multiplicity are coplaner and are in uniform spaced relationship to each other, and also wherein each said multiplicity of sections consists of a total number of sections that is equal to a positive integer multiple of said total number of segments in said first plurality of segments;

2. and, a second means for rotating said second rotatable reflector disc at a preselected speed in synchronization with said preselected speed of said first rotatable reflector disc.

2. A mechanical step scanner, as set forth in claim 1, wherein all said segments of said first plurality of segments are identical.

3. A mechanical step scanner, as set forth in claim 1, wherein all said segments of said second plurality of segments are similar, and all sections in each multiplicity of sections of each segment of said second plurality of segments are identical.

4. A mechanical step scanner, as set forth in claim 2, wherein said first plurality of identical segments consists of three such identical segments.

5. A mechanical step scanner, as set forth in claim 3, wherein said second plurality of similar segments consists of three similar segments, and wherein each multiplicity of identical sections consists of four identical sections.

* * * * *